United States Patent [19]

Sturdy

[11] Patent Number: 4,531,489
[45] Date of Patent: Jul. 30, 1985

[54] ENGINE GOVERNOR WITH REFERENCE POSITION FOR THROTTLE LIMITER

[75] Inventor: Harry D. Sturdy, Wilmington, N.C.

[73] Assignee: Sturdy Truck Equipment, Inc., Wilmington, N.C.

[21] Appl. No.: 471,904

[22] Filed: Mar. 7, 1983

Related U.S. Application Data

[63] Continuation of Ser. No. 168,566, Jul. 14, 1980, abandoned, which is a continuation-in-part of Ser. No. 36,064, May 4, 1979, abandoned.

[51] Int. Cl.³ .............................................. F02D 31/00
[52] U.S. Cl. .................................... 123/320; 123/351; 123/361; 123/376
[58] Field of Search ............... 123/320, 319, 325, 333, 123/351, 352, 361, 370, 371, 376

[56] References Cited

U.S. PATENT DOCUMENTS 3,217,827 11/1965 Pickles ................................. 123/351
3,491,734 1/1970 Mackowiak ......................... 123/352
3,575,257 4/1971 Wojcikowski .................. 123/376 X
3,916,854 11/1975 Barton et al. ....................... 123/363

Primary Examiner—William A. Cuchlinski, Jr.
Attorney, Agent, or Firm—Reising, Ethington, Barnard, Perry & Milton

[57] ABSTRACT

An engine governor having overriding means for limiting the flow of fuel to an engine, means for moving the overriding means to an intermediate reference position upon actuation of the governor, and means for moving the overriding means from the reference position to other positions for limiting the flow of fuel to that suitable for operating the engine at speeds close to a set speed. Means for actuating the governor before the engine reaches the set speed, means for moving the overriding means from the reference position to the other limiting positions at a very slow rate, and means for moving the overriding means toward limiting the fuel flow to a minimum when an over-running load causes the engine speed to run a predetermined amount above the set speed. The engine governor may be combined with a load speed governor for independently governing the engine to a speed safe therefor, and to a lower speed safe for the load and may also have a power take-off governing mode which is selected automatically upon connection of the power take-off to the engine.

29 Claims, 8 Drawing Figures

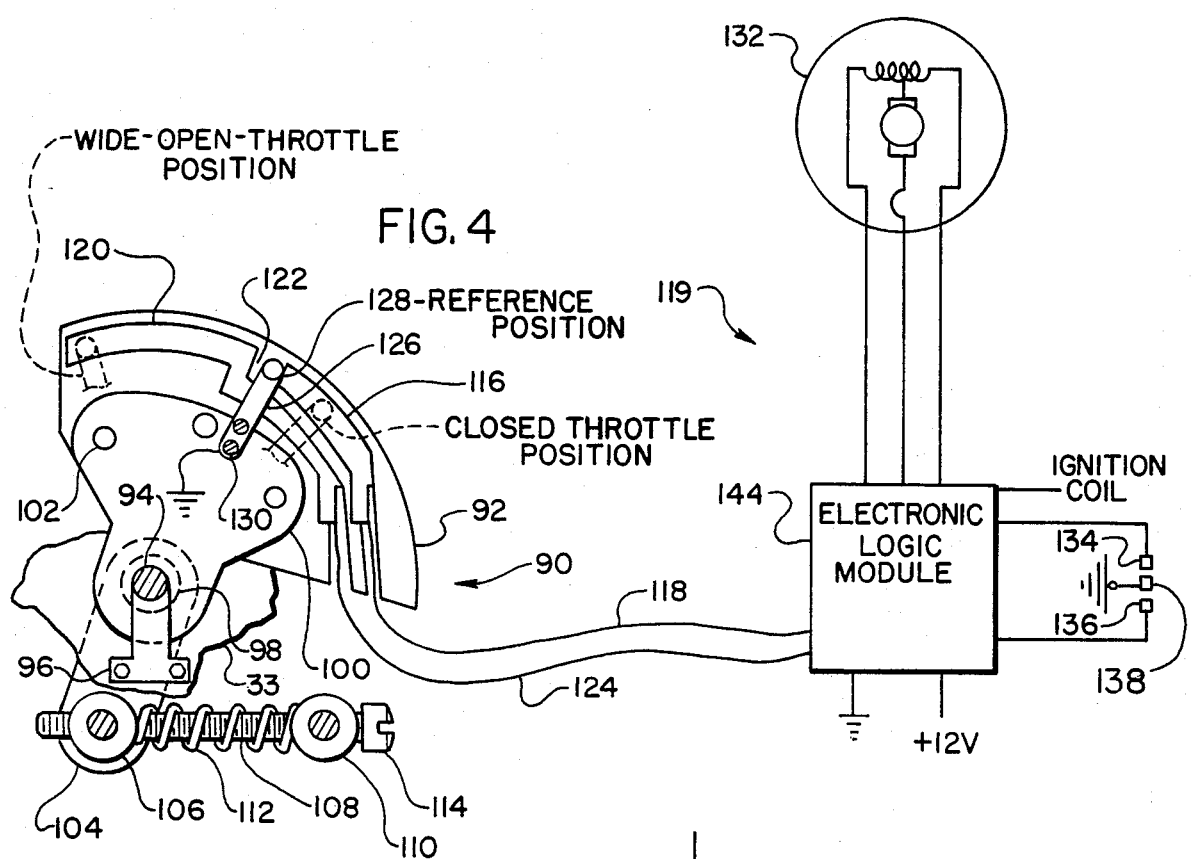
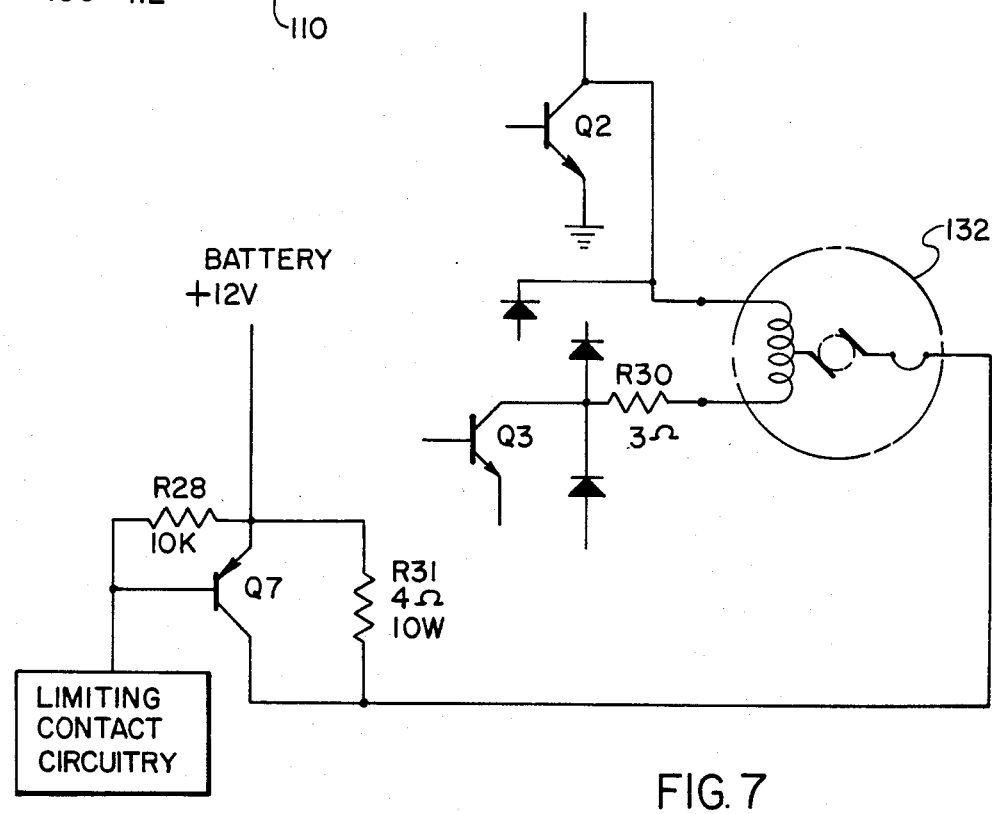

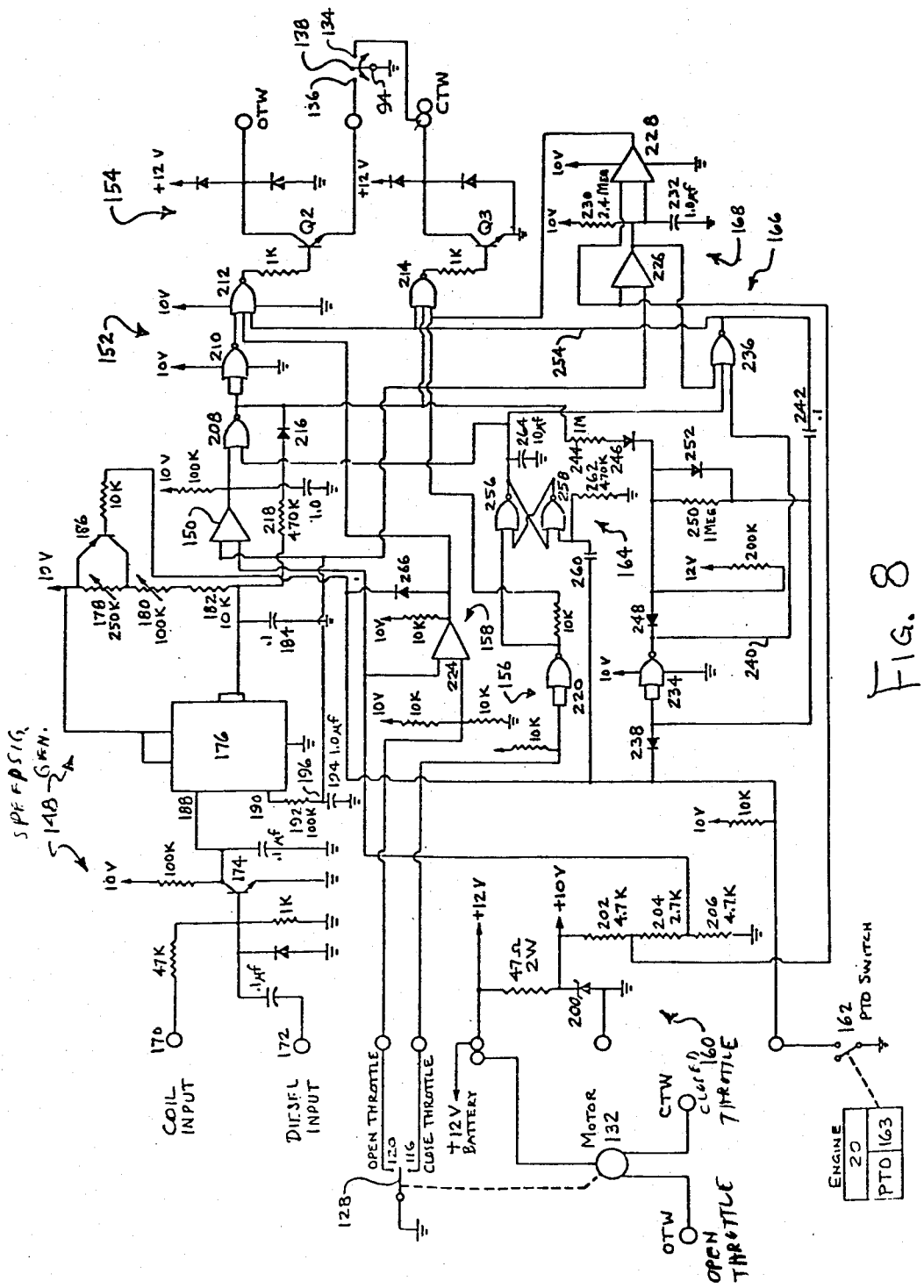

ENGINE GOVERNOR WITH REFERENCE POSITION FOR THROTTLE LIMITER

CROSS-REFERENCE TO RELATED APPLICATION

This application is a continuation of application Ser. No. 168,566, filed July 14, 1980 now abandoned, which is a continuation-in-part of pending U.S. patent application Ser. No. 36,064, filed May 4, 1979 now abandoned.

BACKGROUND OF THE INVENTION

The background of engine governors in general, and a full disclosure of my previous invention in combined engine and load speed governors, is contained in prior U.S. patent application No. 794,615, filed May 6, 1977, now U.S. Pat. No. 4,181,103. My aforesaid engine governor was of a dynamically-surging type which allowed engine speed to oscillate rather rapidly (and forcefully for a vehicle in a lower gear ratio) about its predetermined limit.

While such oscillations are not damaging to the engine and may be helpful in encouraging a truck driver to "get out" of a lower gear ratio and into a higher ratio where the engine will be operating more efficiently, it is also advantageous to have an engine governor which allows the engine to be accelerated to its predetermined speed limit with less overshoot beyond that limit than provided by my previous dynamically-surging governor, and which will thereafter bring the engine quickly to run in close approximation to the predetermined speed limit, wandering from it only perhaps 1% when in a very low gear and less in higher gears, and that probably not on any cyclical basis. Such action is obtained basically by positioning the engine throttle to a predetermined reference position upon acceleration of the engine to a predetermined speed and actuation of the engine governor thereby, rather than by driving the throttle toward a full-closed position as in the aforesaid U.S. Pat. No. 4,181,103.

Such a smooth and gentle control is advantageous for full economy, and for driver and/or passenger comfort, especially for an application such as a school bus engine or a truck engine also used to drive a power take-off (PTO), and is typical of my present invention which provides such an engine speed governor and also combines it with a load or road speed governor essentially like that of the aforesaid U.S. Pat. No. 4,181,103. The present combination functions to safely control engine and load speeds generally like the combination of my aforesaid patent application, except smoothly without the previously-experienced dynamic-surging in engine speed control mode. However, when the smooth governing is used in a PTO governing mode, the aforementioned surging governing may be used therewith in an engine governing mode. The present invention includes an overspeed control which acts to close the throttle beyond the reference position toward a completely closed position in the event of prolonged speeding outside a normal range above the predetermined speed limit (as would be possible for a driver proceeding downhill with the accelerator pedal "floored" or calling for maximum throttle opening), thereby retaining generally the feature of my previous invention which acted to close the throttle toward a completely closed position whenever the engine speed remained anywhere above the predetermined limit.

Like my previous invention, the apparatus of the present invention is a standard unit which may be connected to the standard carburetor, ignition system, and speedometer cable of any engine and vehicle, so that it may be applied at the factory or in the field without inconvenience, and spare parts for this apparatus will be the same for any engine-vehicle combination. However, my present invention also contemplates the use of a lost-motion type overriding carburetor linkage (in place of the equally useable linkage-lengthening capsule disclosed in my aforesaid patent application) which gives a more conventional feel to the accelerator pedal, but with a more complicated parts situation, since each different engine-carburetor combination may require different linkage parts and adaptations. Also, use of a conventional pulse generator connected to the tachometer drive of a Diesel engine is contemplated for application of the apparatus of the present invention thereto.

SUMMARY OF THE INVENTION

Briefly described, the present invention provides a speed limiting governor for use with an engine having a throttle means mechanically movable between an open position and a closed position to regulate the flow of energy-supplying means to the engine, the governor including means for sensing the speed of the engine; means adapted to be connected to the throttle means for selectively overriding the mechanical operation thereof, the overriding means being movable in a first direction toward a closed throttle position and in a second direction toward an open throttle position, and being movable to a predetermined reference position intermediate the open and closed throttle positions; and control means responsive to the speed sensing means for moving the overriding means in the first direction to the predetermined reference position when the engine speed reaches a first preset level. The control means may be responsive to the speed sensing means for moving the overriding means alternately in the second and first directions when the engine speed is within a preset range after the overriding means reaches the reference point, and for moving the overriding means away from the reference point in the second direction when the engine speed falls below the preset speed. The control means may be responsive to the speed sensing means for moving the overriding means to the predetermined reference position and for causing it to cease further movement as long as the engine speed remains within a predetermined speed range above the first preset level.

Preferably, the control means may be responsive to the speed sensing means for moving the overriding means away from the reference position in the first direction when the engine speed exceeds a second preset speed higher than the first preset speed, and for moving the overriding means in the first direction to the predetermined reference position when the engine speed accelerates from one speed level to another speed level within a predetermined amount of time, the one speed level and the aforesaid another speed level both being below the first preset speed level.

A preferable embodiment provides that the control means moves the overriding means away from the reference point in the second direction at a rate of movement which is slower than the rate of movement of the overriding means when it moves in the first direction, and the overriding means may continue moving away from the reference position at the slower rate of movement until the engine speed again exceeds the first preset level or until the overriding means has moved beyond a predetermined reference zone adjacent the reference point, whichever occurs first.

A preferred embodiment provides that the control means causes the overriding means to stop after moving in the second direction beyond the predetermined reference zone until the engine speed exceeds the first preset level and the control means causes the overriding means to move in the first direction, or until the engine speed falls below another preset level that is below the first preset level and the control means causes the overriding means to move in the second direction.

Another embodiment of the invention provides overriding means movable within a predetermined reference zone adjacent the reference position and intermediate the open and closed throttle positions thereof, and the overriding means moves at a relatively slow rate of movement during its movement within the predetermined reference zone and at a relatively fast rate of movement during its movement outside the predetermined reference zone.

Preferably, the relatively fast and slow rates of movement of said overriding means are both constant, and it is preferred that the movement of the overriding means in at least one direction should occur at a predetermined constant rate of movement selected to cause the engine speed, in the normally loaded operation thereof, to vary with the movement with minimal lag therebehind and prevent any significant oscillation of the engine speed about the set speed therefor.

Expressed in other terms, the governor includes means for sensing the speed of the engine, and throttle overriding means operatively associated with the speed sensing means for selectively engaging the throttle means to automatically move it toward the closed position thereof at a first relatively fast rate of movement when the speed of the engine exceeds a preset level and the throttle means is open beyond a predetermined reference zone intermediate the open and closed positions of the throttle means, and for controlling the movement of the throttle means in either a throttle opening or throttle closing direction to provide a second relatively slow rate of movement therefor when the throttle means is within the reference zone and is engaged by the overriding means.

A further embodiment of the invention provides control means responsive to the sensed engine speed for causing movement of the overriding means in at least one direction at a predetermined unchanging average rate of movement selected to cause the engine speed, in the normally loaded operation of the engine, to vary with the movement with minimal lag therebehind and prevent any significant oscillation of said engine speed about said set speed, and the control means includes means for generating and transmitting power pulses to the motor means for operating the motor means to cause the aforesaid average rate of movement of the overriding means, the power pulses exerting relatively larger maximum forces to insure positive movement of the overriding means against the operational resistance imposed thereon and exerting a relatively smaller average force for causing the aforesaid average rate of movement of the overriding means.

Yet another embodiment of the present invention provides a speed-limiting governor for use with an engine having means for selective driving connection to and disconnection from a power take-off and a vehicle, both individually and simultaneously, and having mechanically operated throttle means movable between a fully opened position and a fully closed position for causing variation of the speed of the engine, the governor including means for sensing the speed of the engine; means for sensing the speed of the vehicle; means for generating a signal when the power take-off is connected to the engine; means adapted to be connected to the throttle means for selectively overriding the mechanical operation thereof, the overriding means being movable between an open throttle position and a closed throttle position for selectively limiting the speed of the engine and the vehicle to respective set speeds; and control means selectively responsive to the power take-off connection signal and the sensed engine speed for causing movement of the overriding means to limit the speed of the engine to a first predetermined set speed, the sensed vehicle speed for causing movement of the overriding means to limit the speed of the engine to a level that limits the vehicle speed to a predetermined set speed, and the sensed engine speed for causing movement of the overriding means to limit the speed of the engine to a second predetermined set speed.

The overriding means is preferably movable to a predetermined reference position intermediate the open and closed throttle positions and the control means causes the overriding means to move to the reference position in response to the signal being generated by the connection of the power take-off to the engine, the reference position being selected to cause the overriding means to limit opening movement of the throttle means beyond a position which causes the engine to operate at approximately the first set speed when the engine is under no load. It is preferred that the overriding means be movable to a predetermined reference position intermediate the open and closed throttle positions and the control means be responsive to the signal generated by connecting the power take-off to the engine to cause the overriding means to move to the reference position at a relatively fast rate of movement and thereafter to move at a relatively slow rate of movement during its movement within a predetermined reference zone adjacent the reference position.

BRIEF DESCRIPTION OF THE DRAWINGS

FIG. 4 shows the switch plate of the present governor as connected to the electronic control portion thereof;

FIG. 7 shows a schematic diagram of a portion of an electronic circuit providing slow motion of the throttle-limiting means as desired; and FIG. 8 shows a schematic circuit diagram providing for selective governing of load speed, engine speed, and power take off (PTO) speed.

DESCRIPTION OF THE PREFERRED EMBODIMENTS

Figure 1:
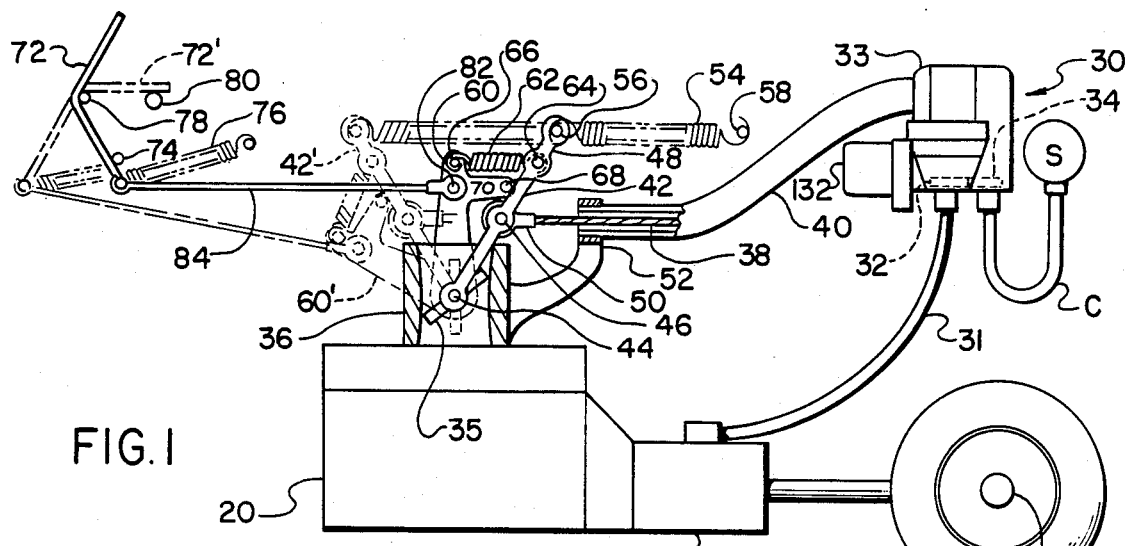
FIG. 1 is a diagrammatic view showing the engine and load speed governor of the present invention connected to a transmission, carburetor linkage, and accelerator pedal of an engine connected to vehicle wheels by the transmission.

In the illustrated embodiment shown schematically in FIG. 1, an internal combustion engine 20 has connected thereto a transmission 22 for driving a load 24 such as the drive wheels of a truck. The transmission 22 is of the usual construction which allows automatic or manual shifting of the gears therein to provide various ratios of speeds between the engine 20 and the load 24. Typically, in a truck, the transmission 22 is shifted into "low gear" to start the load 24 moving at very low speeds, as from a standing start, so that the engine 20 can operate at a rotational speed of thousands of revolutions per minute, where it operates most efficiently, while the load 24 is eased into motion by a friction clutch or hydraulic connection (not shown) included in the transmission 22, and a very large torque is applied through the gearing of the transmission 22 to the axle 26 of the drive wheels 28 of the load 24, it being understood that the engine 20 and the transmission 22 are attached to and part of the load 24. As the drive wheels 28 pick up speed, and before the engine 20 reaches some safe limit to its short term rotational speed, such as 4,400 rpm for example, it is desirable to shift the transmission 22 into a "higher gear" ratio where the wheels 28 will turn at a higher rpm relative to the engine 20, and the power of the engine 20 will be applied through the transmission 22 to the wheels 28 to further accelerate their speed until the engine 20 again approaches its safe rotational speed. This process of accelerating the engine 20 toward its maximum speed and shifting into a "higher gear" continues until the wheels 28 are driving the load or truck 24 along at a safe and suitable road speed, at which time the transmission will be in its nominal "high gear", the load or truck 24 may be running along at 50 miles per hour, and the engine 20 may be revolving at 3,000 rpm.

It is desirable that the road speed of the load 24 should be controlled or governed to some safe speed such as 55 miles per hour and it is also desirable that the speed of the engine 20 be governed or controlled to its maximum safe speed for long term operation, such as a speed of 4000 rpm, and the engine and load speed governor 30 of the illustrated embodiment of this invention has overriding means for limiting the flow of the energy-supplying means or fuel to the engine to automatically and selectively control both speeds with peculiar advantages to each.

Figure 2:
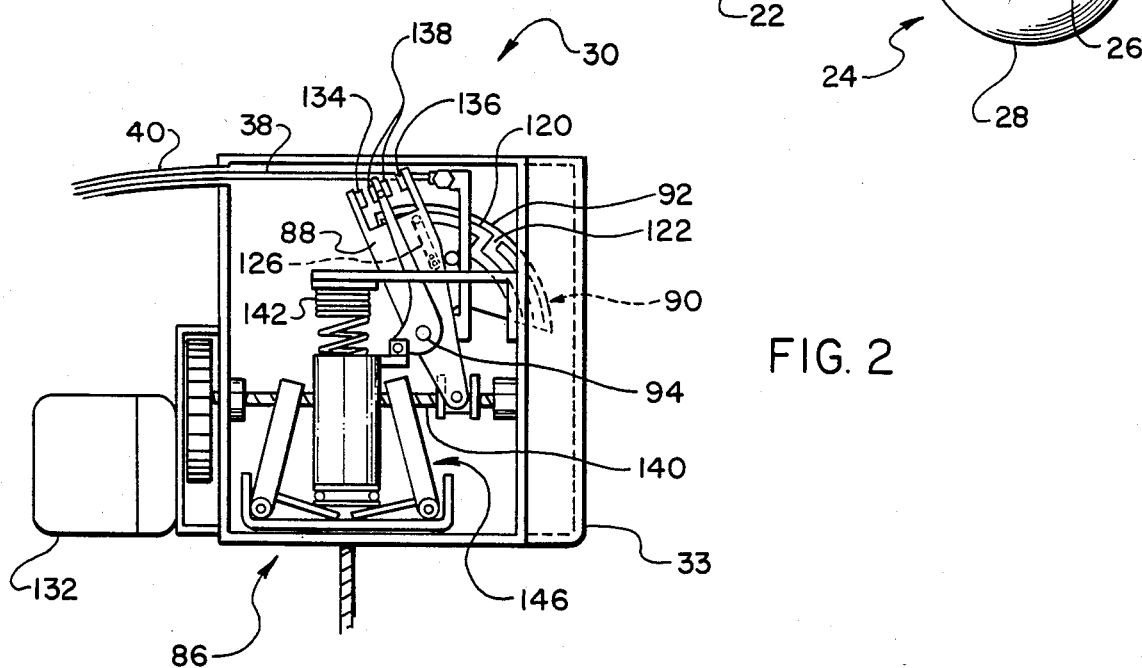
FIG. 2 is a diagrammatic view showing mechanical details of the governor proper.

The governor 30 is shown schematically in FIG. 1 connected to the load side of the transmission 22 by the flexible rotary cable 31, which may be the typical "speedometer cable", and which transmits rotary motion at a speed proportional to the speed of the wheels 28. A gear 32 connected to the cable 31 inside the housing 33 drives an output gear 34 which is connected to a speedometer cable C for driving a speedometer S which may be located on the dashboard of the truck cab. Governor 30 is connected to the carburetor throttle plate 35 of the carburetor 36 of the engine 20 by a flexible pull cable 38 enclosed within a flexible sheath 40 of fixed length attached to and extended from the governor 30, as shown in FIGS. 1 and 2. The connection between throttle plate 35 and cable 38 is by means of the throttle arm 42 mounted on throttle shaft 44 to which the throttle plate 35 is affixed, and a stud 46 fixed in the free end 48 of the throttle arm 42 intermediately thereof forms a mounting point for a pivotable eye fitting 50 which is permanently attached to the free end of the cable 38.

The extended end of the flexible sheath 40 is attached to a bracket 52 mounted to the carburetor 36 for holding the end of the sheath 40 in general alignment with the stud 46 and the eye fitting 50 on the extending end of the cable 38. A first tension spring 54 is stretched between a first pin 56 installed near the extremity of the free end 48 of the throttle arm 42 and a second pin 58 fixed in relation to the carburetor 36 for holding the throttle plate 35 in its normally nominally closed or idle position as shown in FIG. 1 in solid lines. An accelerator arm 60 is mounted for free rotation on the throttle shaft 44 and is connected to the throttle arm 42 by a second extension spring 62 stretched between a third pin 64 and a fourth pin 66, the pins being respectively fixed in the free ends of the arms 42 and 60. The spring 62 is substantially stronger than the spring 54. A stop 68 on an extending portion 70 of the accelerator arm 60 is biased against the throttle arm 42 by the spring 62 under normal idling conditions for the engine 20.

An accelerator pedal 72 is normally biased to an idle position against a pedal stop 74 by a third extension spring 76 of suitable strength and is suitably freely pivoted on a pedal shaft 78 for pedal actuation to a full or wide open throttle position (indicated by the numeral 72') against a floorboard stop 80. The lower end of the pedal 72 is connected to a fifth pin 82 mounted on the free end of the accelerator arm 60 by a link 84 pivotable at the pedal 72 and the pin 82. The link 84 is of suitably adjusted length to place the pedal 72, the accelerator arm 60, and the throttle arm 42 simultaneously in their respective normal or idle positions as shown in solid lines in FIG. 1.

When the governor 30 is in its normal or unactuated condition, the cable 38 may be freely pulled out from its sheath 40 by pivoting the throttle arm 42 counter-clockwise against the bias of the spring 54. By depressing the pedal 72 against stop 80 to its wide open position, the accelerator arm 60 will be rotated counterclockwise to its wide open throttle position as shown in broken lines and indicated by the numeral 60' in FIG. 1; and the spring 62 will pull the throttle arm 42 to its wide open throttle position as shown in broken lines and indicated by the numeral 42'.

Figure 3:
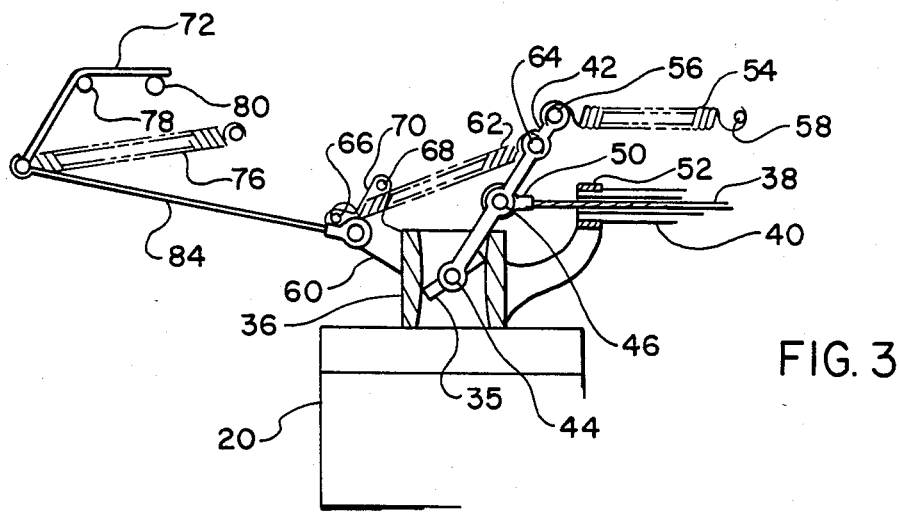
FIG. 3 shows the throttle linkage of FIG. 1 in a different configuration.

When the governor 30 has been actuated as described hereinafter, and the eye fitting 50 at the extending end of the cable 38 has been pulled back toward its normal or idle position as shown in solid lines, the counter-clockwise movement of the throttle arm 42 will be limited accordingly, and the spring 62 will be stretched as necessary to accommodate any mismatch between the position of the pedal 72 and the position of the throttle arm 42. The extreme mismatch, as shown in FIG. 3, occurs when the pedal 72 is at the wide open throttle position and the throttle arm 42 has been limited to its idle position by withdrawal movement of the cable 38, the spring 62 is at its maximum stretched condition, and the cable 38 extending from the governor 30 is thereby fully overriding the call from the accelerator pedal 72 for full throttle. Intermediate positions of the pedal 72 and the arm 60 are available at the will of the operator, as are intermediate positions of the throttle arm 42 as permitted by the limiting action of the cable 38.

The pedal 72 is thereby free to be positioned wherever the operator desires, and so long as the governor cable 38 is in its fully extended, normal, non-limiting position, the accelerator arm 60 and the throttle arm 42 will be biased together by the spring 62 to move as one, and the throttle plate 34 will open and close according to the position of the pedal 72. If the cable is retracted to limit the throttle opening, the spring 62 will stretch as necessary upon depression of the pedal 72 so that the accelerator pedal will have a generally normal feel just as a conventional accelerator pedal and throttle linkage. The accelerator pedal and throttle and carburetor linkage disclosed is schematic and representative of infinite mechanically equivalent variations to suit particular engine-carburetor-vehicle combinations. Particularly, torsion springs may be substituted for the tension springs disclosed, for space and configuration considerations, and a similar apparatus could be adapted for use with the control lever of a Diesel or gasoline fuel injection system, or other means of limiting the flow of energy-supplying means to a motor or engine, even an electric one.

The construction and operation of the load speed governor portion 86 of the present invention as shown in FIG. 2 is generally the same as that disclosed in my aforesaid patent, and no further disclosure is needed herein except to point out the additional elements incorporated therewith as shown in FIGS. 2 and 4 to provide means for moving the carrier 88 to a predetermined reference position upon actuation of the engine speed governor portion 90 of the engine and load speed governor 30:

An arcuate switch plate 92 is mounted to pivot for adjustment about the carrier shaft 94 which is affixed to the housing 33 by means of a bracket 96 attached inside the housing. The plate 92 is formed of insulating material and is mounted on a metal hub 98 which is mounted for pivoting on the shaft 94. The hub 98 has an attachment flange 100 to which the plate 92 is fastened by rivets 102. The plate 92 is located directly behind the carrier 88 within the housing 33, and the bracket 96 supports the shaft 94 between the carrier 88 and the hub 98. The shaft 94 and hub 98 mounted thereon extend rearwardly through an opening in the housing 33. Outside the housing 33 a crank arm 104 is attached to the hub 98 and has an extending end in which is mounted a pivotable stud 106 having a threaded cross hole into which is threaded an adjustment screw 108. The shank of the screw 108 at the head end thereof passes through a clearance hole in a stud 110 fastened to the outside of the housing 33, and a compression spring 112 mounted on the screw 108 between the studs 106 and 110 holds the two studs 106 and 110 biased firmly apart to a distance limited by the head 114 of the screw 108.

Thus, rotary adjustment of the screw 108 acts to change the distance between the studs 106 and 110, thereby pivoting the switch plate 92 about the shaft 94 to set the plate 92 at any desired position within a suitable range of adjustment. Such positioning is desirable in order to angularly place a reference position contact 116 as desired in relation to the carrier 88. The contact 116 is mounted on the switch plate 92 in arcuate relation to the hub 98, and is connected to an electrical lead 118 for connection to the electronic control portion 119 of the governor 30 as explained hereinafter. The contact 116 extends clockwise from a generally central portion of the arcuate shape of the plate 92, and a somewhat similar limiting contact 120 is mounted on the plate 92 spaced a small gap 122 counter-clockwise from the contact 116 and extending along the same arc as contact 116 in a counter-clockwise direction generally to the left side of the plate 92. The contact 120 is connected to an electrical lead 124 for connection to the electronic control portion 119.

An electrically conductive spring leaf 126 having a carrier electrical contact 128 at one end thereof is fastened at the other end to the rear side of the carrier 88 by rivets 130 (see FIG. 2) and is sprung away from the carrier 88 for springbiased contact with the switch plate 92 and the contacts 116 and 120 along the arcs thereof wherever the carrier 88 may be positioned as explained in my aforementioned patent application or to be explained hereinafter. By its connection to the carrier 88, the contact 128 is a grounding contact so far as the electronic control portion of the governor is concerned. In FIG. 4 the carrier 88 has been broken away, and the spring leaf 126 and the contact 128 are shown in more detail in relation to the switch plate 92. The left, or counterclockwise end of the reference position contact 116 forms the actual reference point or position to which the carrier contact 128 is moved and homed for establishing a reference position for the carrier 88 and thereby the overriding means for limiting the flow of energy-supplying means which is an object of the present invention.

A reversible electric motor 132 is included in the electronic control 119, as are the accelerate or open throttle contact 134, the decelerate or close throttle contact 136, and the grounding contacts 138 which control the motor 132 at the command of the load speed governor 86 to turn the lead screw 140 which in turn causes the carrier 88 to move in rotation on the shaft 94.

In simplest terms, the governor 30 of the present invention functions as follows: In the absence of a signal to the contrary, either from the load speed governor 86 or the engine speed governor 90, the load speed governor 86 acts to move the carrier 88 to its extreme counter-clockwise, rest, or wide-open-throttle position as shown in FIG. 2, where the flow of fuel or energy-supplying means to the engine 20 is not limited at all by the governor 30, but is dependent upon the operator-positioned accelerator and throttle linkages as described hereinbefore and in my aforementioned prior patent application. Then, in the absence of a load speed sufficient to actuate the load speed governor 86 as described in my aforesaid patent (e.g. when the transmission 22 is in neutral, or in a lower gear ratio where the engine must reach a speed far above the governed speed in order to actuate the load speed governor 86) the electronic control 119 may assume control of the governor 30 as explained hereafter.

The electronic control 119 monitors the speed of the engine 20 for detection of operation of the engine at a predetermined governed or set speed such as 4000 rpm, and at at least three other speeds having predetermined relations to the set speed: A precall speed which may be 600 rpm below the set speed, a close throttle speed which may be 400 rpm below the set speed, and an overspeed speed which may be 300 rpm above the set speed.

Upon acceleration of the engine and detection of the precall speed, 3400 rpm in this example, the control 119 initiates a timing circuit, and, if within a predetermined time period such as 0.2 seconds, the close throttle speed of 3600 rpm or above is detected, then the control 119 will connect electrical power (from the engine electrical system) to the motor 132 to cause it to rotate in close throttle direction, thereby turning the lead screw 140 appropriately to cause the carrier 88 to move in clockwise or close throttle direction away from its rest position. Once initiated, this close throttle movement of the carrier 88 will continue until the carrier contact 128 touches the reference position contact 116, thereby automatically moving the carrier 88 to a reference position which has been preset to allow an unloaded engine speed just slightly above the set speed (4000 rpm in this example) of the electronic control 119. If acceleration of the speed of the engine 20 from 3400 rpm to 3600 rpm takes longer than 0.2 seconds, the control 119 takes no further action, and the engine speed governor 90 remains unactuated until the engine speed reaches the 4000 rpm set speed, at which time the control 119 energizes the motor 132 in the close throttle direction to move the carrier 88 to its reference position.

If upon arrival of the carrier 88 at its reference position, the engine speed is detected by the electronic control 119 to be at 4000 rpm or within a range thereabove extending to 4300 rpm (the overspeed speed in this example), then the electronic control 119 will react to the carrier contact 128 touching (thereby making electrical contact with) the reference position contact 116 by reversing the energization of the motor 132 to the open throttle mode, whereupon the carrier 88 is moved counterclockwise until the carrier contact 128 breaks contact with the reference position contact 116. Once the electrical circuit between contacts 128 and 116 is broken, a continuing detection of an engine speed within the aforesaid range of 4000–4300 rpm causes the control 119 to again energize the motor 132 in the closed throttle direction to drive the carrier contact 128 back to the reference position contact 116 for continuing repetition of the open throttle-close throttle driving cycle in a so-called "alternating circuit" mode of operation so long as the engine speed remains in the 4000–4300 rpm range. In the preferred embodiment of the present invention, the movement of the carrier contact during the repetitive cycle may be only 0.005–0.010 inch, so that the cable 38 may move little or none, what with normal clearances and backlash in the apparatus. The throttle plate 35 is thus limited to being opened to a corresponding reference position, even though the accelerator pedal may be fully depressed, and will initially be closed to the reference position by the overriding action of the carrier 88. If upon arrival of the carrier contact 128 at the reference contact 116, the engine speed is below 4000 rpm, the control 119 will reverse the motor 132 to the open throttle direction and release control of the motor 132 to the load speed governor contacts 134 and 138 for return of the carrier 88 to its wide-open-throttle or rest position.

If upon arrival of the carrier contact 128 at the reference contact 116 the engine speed has reached the overspeed speed of 4300 rpm, then the control 119 will cause the electrical contact between contacts 128 and 116 to be ignored, and the carrier 88 will continue to be driven in close throttle direction past the reference contact 116 until the control 119 detects engine speed within the 4000–4300 rpm range or the carrier reaches its maximum close throttle, idle, or overspeed position. This condition normally will occur only when an overrunning load has been applied to the governed engine, such as running the associated vehicle down a steep hill, or when the switch plate 92 has been miss-set. Upon deceleration of the engine speed to within the 4000–4300 rpm range, the control 119 will energize the motor 132 in the open throttle direction until the carrier contact 128 loses contact with the reference position contact 116 and the governor 90 will revert to the alternating circuit mode of operation.

In normal operation, three operating conditions should be considered, the first being that where the engine cannot maintain the governed or set speed with the throttle plate 35 at its reference position because of a heavy load such as an uphill grade, so that engine speed falls below the exemplary 4000 rpm set speed after having attained it under full throttle and actuated the carrier 88 toward its reference position to limit the throttle plate 35 to some lesser opening. As soon as the engine reacts to moving the throttle plate toward its reference position by decelerating below 4000 rpm, the governor 90 will be deactuated by the control 119, and the carrier 88 will be moved toward open throttle until the engine again accelerates to the set speed of 4000 rpm, which will reverse the carrier into movement toward closed throttle once again—thus the throttle plate 35 will oscillate through a limited range of positions as necessary to hold the engine speed very near the set speed, the frequency and magnitude of the oscillations of the throttle plate 35 and the engine speed being determined by the interrelationships of engine power, load applied, and gear ratio being used in the transmission 22, or accelerational decelerational capacity of the engine, together with the response speed of the motor 132 and its screw 140 driving the carrier 88.

The second operating condition is that where the reference position of the throttle plate 35 is just sufficient to maintain the engine speed in the 4000–4300 rpm range—in this case, the control 119 will keep the governor 90 in its alternating circuit mode of operation, and the engine speed may wander within the 4000–4300 rpm range while the throttle plate 35 is held at its reference position (assuming that the accelerator pedal 72 is held depressed at least sufficiently to open the throttle plate 35 that far). If the engine speed goes outside the 4000–4300 rpm range, the governor 30 will be deactuated below 4000 rpm or go into the overspeed mode of close throttle drive as explained hereinbefore above 4300 rpm.

The third operating condition is that where an overrunning load such as a moderate downhill grade is imposed on the engine 20 such that when the governor 30 has acted to close the throttle plate 35 to its idle or overspeed position, as previously explained, then the engine speed drops below 4300 rpm, thereby causing the carrier 88 to move back toward its reference position. Assuming the accelerator pedal 72 being sufficiently depressed, the throttle plate 35 will open until the engine speed again goes above 4300 rpm and the control 119 causes the carrier to move in close throttle direction again, and the cycle will repeat, allowing small oscillations of the throttle plate 35 about an average position permitting an engine speed of about 4300 rpm and small oscillations of the engine speed about 4300 rpm. Here again, the parameters of engine accelerational/decelerational ability, gear ratio, and carrier 88 response time determining the period and magnitude of the oscillations.

Operation of the engine 20 at speeds below the set speeds is perfectly free of any control by the engine speed governor 90 except in the aforementioned case of rapid acceleration between precall and close throttle speeds of 3400 and 3600 rpm respectively.

An electronic logic module 144 (not shown in FIGS. 1 and 2) for the electronic control portion 119 of the governor 90 is mounted within the housing 33 of the governor 30. As shown schematically in FIG. 5, the module 144 includes conventional integrated circuits and electronic components which operate as described below to receive negative pulse signals from an internal combustion engine ignition coil (or alternatively from a pulse generator connected to a Diesel engine or other prime mover), and signals from the switch plate contact 116 and the open and close throttle contacts 134 and 136 respectively, in order to control the reversible electric motor 132 as described hereinbefore.

To control engine speed a method is first needed to detect the engine speed. This is accomplished by a frequency to voltage converter. The engine speed is proportional to the number of ignition pulses per minute as monitored at the negative terminal of the ignition coil of the engine 20. These pulses are fed into terminal A. Voltage divider resistors R1 and R2 are selected so that the transistor Q1 (normally off) will turn on once for each ignition pulse. A resistor R3, a variable potentiometer P1 and a capacitor C1 form a resistor-capacitor timing network. For each ignition pulse, the transistor Q1 will turn on, and in turn fully discharge the capacitor C1. As the engine speed increases, the transistor Q1 will turn on more frequently. With the transistor Q1 off, the capacitor C1 starts to charge. As the voltage rises on the capacitor C1 to approximately ½ of the ten volt supply voltage, the logic norgate IC1-1 of the quad norgate IC1 will have its output (pin 3) change state from high to low. When the output is high, the capacitor C2 is being charged through the resistor R4. A change in output from high to low will cause the capacitor C2 to be discharged. By properly selecting the values of R3, P1, C1, R4 and C2, an average voltage will appear on the capacitor C2 which is proportional to engine speed. The faster the engine speed (ignition pulses) the higher the voltage, the slower the engine speed the lower the average voltage.

A voltage comparator circuit is used to determine when various predetermined engine speeds occur. The speeds are: precall, close throttle, governed, and overspeed. The circuit consists of a quad voltage comparator IC2 and five resistors R19, R5, R9, R10, and R11 which set the individual voltages at which each comparator functions.

The precall and close throttle comparators operate cooperatively in sequence. Their purpose is to determine whether the engine is accelerating in speed so fast that the engine speed governor should be actuated before the set speed is reached. If this condition occurs, the precall and close throttle comparators IC2-1 and IC2-2 act together to start the governor operating even before the predetermined governed speed is reached. A typical example would have the precall speed set at 3400 RPM, the close throttle speed at 3600 RPM, the governed speed at 4000 RPM and the overspeed at 4300 RPM. If the engine should accelerate between 3400 and 3600 RPM within 200 milisec, this rate of acceleration would cause the close throttle norgate IC1-2 to function to operate and activate the governor. When the engine speed increases at a slower rate the precall close throttle circuitry is inoperative and plays no part in the operation.

Upon reaching 4000 RPM, the governor or set speed comparator IC2-3 begins its normal governing. At 4300 RPM the overspeed comparator IC2-4 turns on, causing the governor 90 to go toward completely closing the throttle plate 35.

When the engine acceleration exceeds the normal governor reaction capability, the close throttle comparator IC2-2 causes the control 119 to start the governing process prior to 4000 RPM being reached. In the event of such a condition, the precall and close throttle comparators IC2-1 and IC2-2 provide signals to the close throttle norgate IC1-2 which in turn provides a signal to a flip-flop circuit composed of the two norgates IC1-3 and IC1-4. With the proper signal the flip-flop circuit is set so that the output of pin 4 of IC1-4 goes high and acts through the norgates IC3-1 and IC3-2 of the quad norgate IC3 to cause the transistor Q2 to drive the motor 132 and the associated carrier contact 128 in the close throttle direction. Upon the carrier contact 128 reaching the normally open reference position contact 116 of the switch plate 92 the flip flop circuit receives a reset signal from the norgate IC3-3 at pin 5 of the norgate IC1-4 and pin 4 thereof goes low. The precall close throttle function cannot reoccur unless the engine speed drops below the 3400 RPM precall level, and only then could the process be repeated.

The quad norgate IC3 comprises the logic circuitry which allows the electronic logic module 114 to control the governor 90 in proper sequence. Pin 6 of norgate IC3-1 is normally low. With a high signal at pin 6, the output pin 4 of norgate IC3-1 goes low and causes the output pin 10 of norgate IC3-2 to go high. This will turn on the transistor Q2 and drive the motor 132 in the close throttle direction. The motor continues driving the carrier 88 in the close throttle direction until its contact 128 reaches the reference position contact 116. Grounding the reference contact 116 causes pin 2 of the norgate to go low and pin 3 thereof to go high. Pin 3 going high will cause pin 10 of the norgate IC3-2 to now go low. When pin 10 goes low, it causes pin 11 of the norgate IC3-4 to go high which turns on the transistor Q3, driving the motor 132 in the open throttle direction. The carrier 88 going in the open throttle direction will remove the carrier contact 128 from the reference contact 116 and change pin 2 of the norgate IC3-3 from low back to high and the process will keep repeating. This operation is known as the alternating circuit feature since the motor 132 will alternately drive the carrier contact 128 on and off the reference contact 116. The amount of movement is very small and effectively keeps the carrier 88 at its reference position at the threshold of the reference position contact 116.

Should the engine speed keep increasing to 4300 RPM as does happen in some isolated instances, it is necessary that the alternating circuit mode be overridden so that the motor will drive the carrier contact 128 past the threshold of the reference contact 116 fully in the close throttle direction. When such an instance is detected by the overspeed comparator IC2-4, pin 14 thereof goes high and continually holds pin 3 of the norgate IC3-3 low. This overcomes the effect of the reference contact 116 being grounded at pin 2 of the norgate IC3-3 and allows pin 10 of the norgate IC3-2 to remain high as long as the overspeed condition exists. Dropping below the overspeed value of 4300 RPM allows the governor comparator IC2-3 circuitry to govern as normal.

Figure 5:
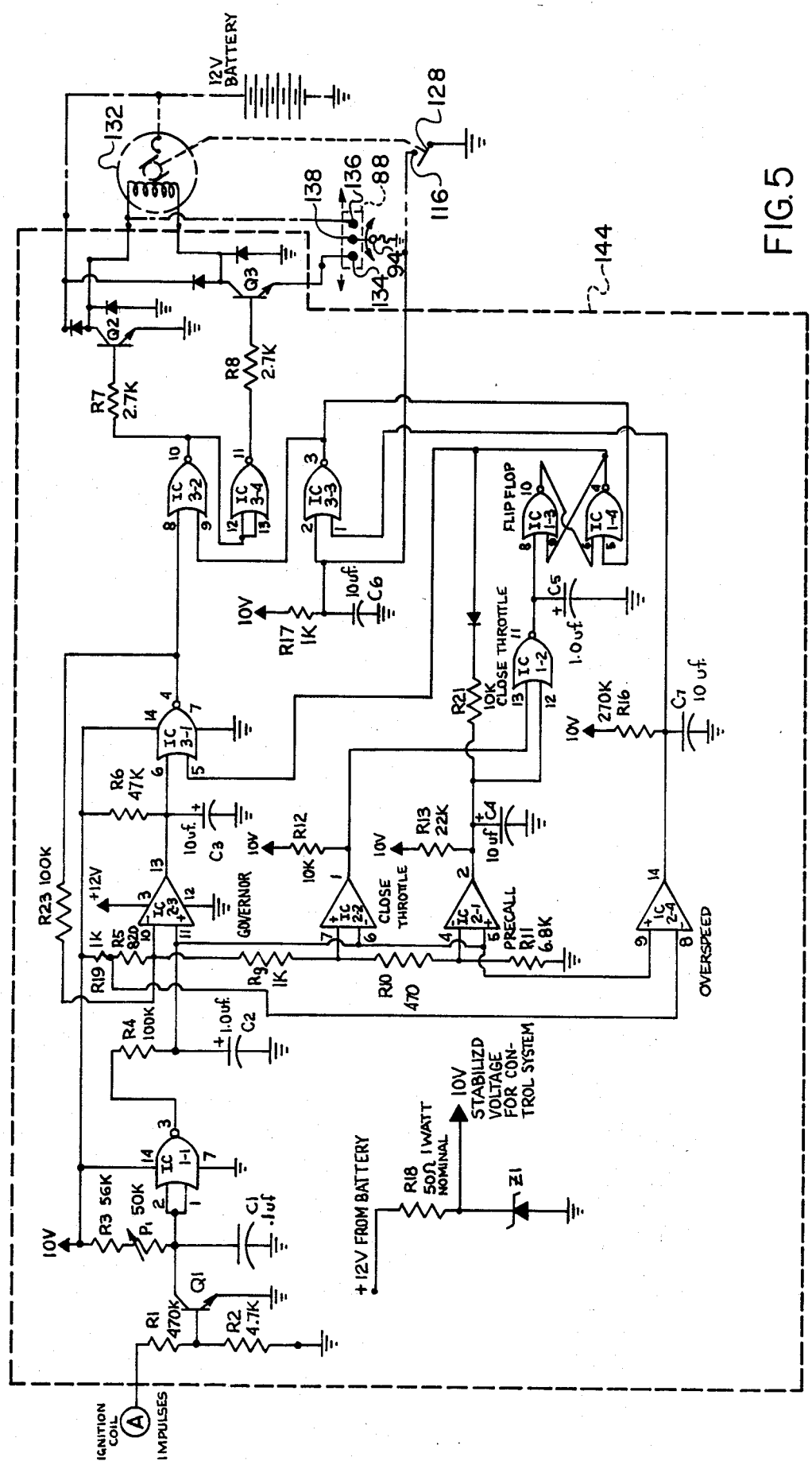
FIG. 5 shows a schematic circuit diagram of an electronic control providing for positioning the throttle-limiting means at a reference position.

The Zener diode Z1 in series with the resistor R 18 across the 12 volt battery supply voltage, as shown in FIG. 5, provides a stabilized 10 volt supply for the logic module 144 as indicated at various points therein.

Figure 6:
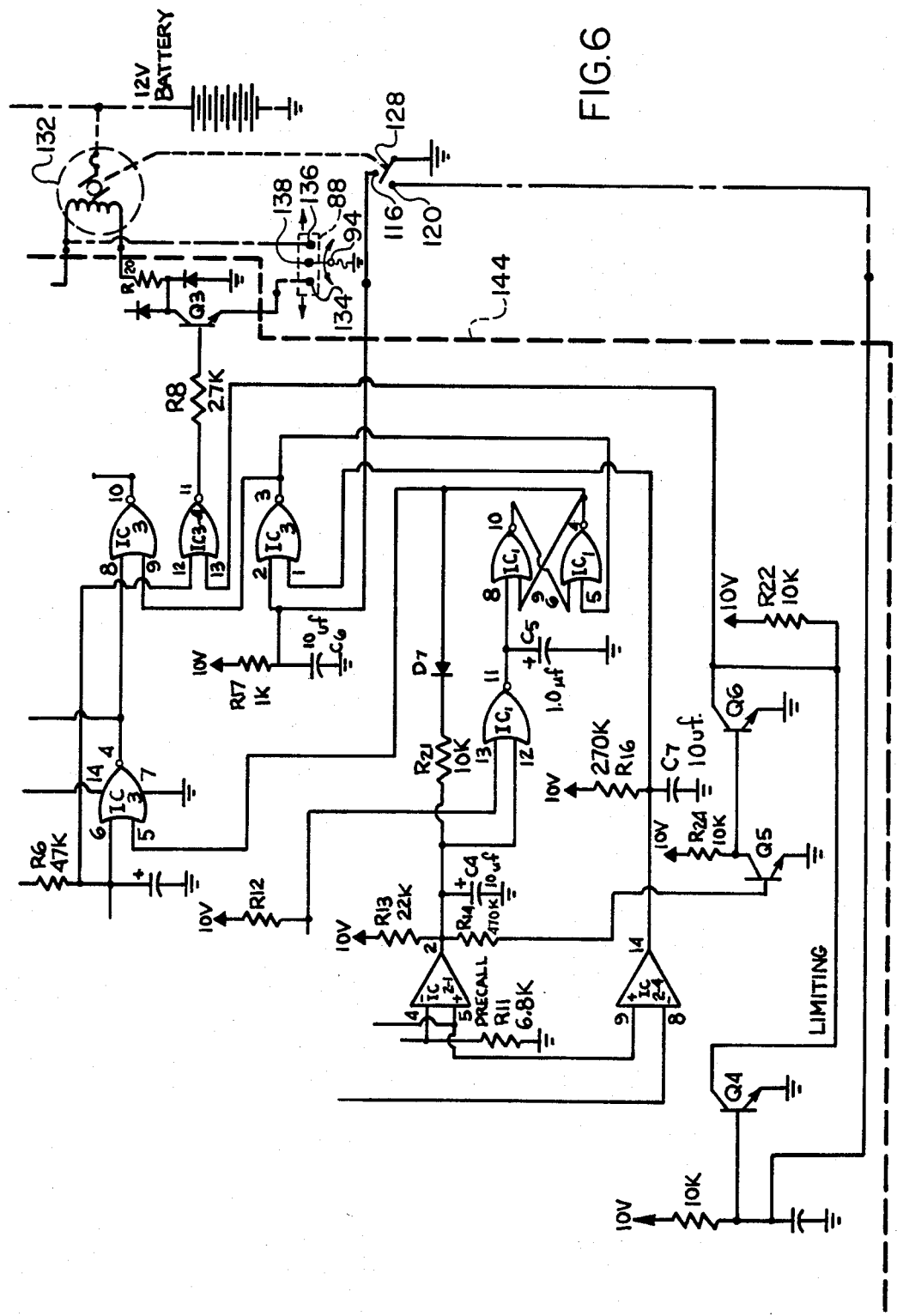
FIG. 6 shows a schematic circuit diagram of the portion of an alternate electric circuit providing slow motion of the throttle-limiting means in one direction.

An alternative second embodiment of the engine speed governor 90 provides for operation of the motor 132 (and thereby the carrier 88) at a substantially slower speed in open throttle direction than in close throttle direction—approximately 15-18 seconds to rotate the carrier 88 from idle position to wide-open-throttle position as compared to about 3 seconds to rotate it from wide-open-throttle to idle position. The slower speed is accomplished by the circuitry of FIG. 6, which shows in schematic detail the changes and additions to the circuitry of FIG. 5—the portions of FIG. 5 which are not repeated in FIG. 6 are identical in both circuits. The additional resistor R20 in the connection between the transistor Q3 and the motor 132 serves to reduce the voltage supplied to the motor, and with the resultant reduced speed, it is desirable that, upon arrival of the carrier contact 128 at the reference contact 116 subsequent to actuation of the governor 90, that the contact 128 should remain at the reference contact so long as the engine speed remains in the 4000-4300 RPM range. Therefore, the pin 13 of the norgate IC3-4 is now connected to limiting circuitry comprising the transistors Q4, Q5, and Q6 and their associated added components. Now, when the contact 128 touches the contact 116, the motor 132 is turned off, and so long as the engine speed remains in the 4000-4300 RPM range, it remains off. If the engine speed drops below 4000 RPM, the governor comparator IC2-3 will cause the motor 132 to run in open throttle direction (at the slow speed) until the engine again rises to 4000 RPM, or until the carrier 88 moves in open throttle direction sufficiently for the carrier contact 128 to cross the narrow gap 122 and touch the limiting contact 120 on the switch plate 92—in either case, the open throttle drive ceases; and in the first case the governor comparator IC2-3 causes the motor 132 to drive in the close throttle direction, while in the second case the carrier contact 128 remains at the limiting contact until the engine either rises to 4000 RPM and the governor comparator IC2-3 causes close throttle drive, or the engine drops below the precall speed of 3400 RPM and the precall comparator IC2-1 causes open throttle drive, carrying the carrier contact 128 past its initial contact with the limiting contact 120 toward the wide-open-throttle position of the carrier 88.

This second, slow speed, embodiment is advantageous for lessening engine speed oscillations, but is disadvantageous in that the slow travel of the carrier 88 toward open throttle may sometimes handicap the operator who is trying to get a rapid acceleration of the engine for shifting gears.

Yet a third embodiment of my engine speed governor invention provides for normally fast travel of the carrier 88 toward its reference position upon actuation of the engine speed governor 90 until the carrier contact 128 moves off the limiting contact 120, at which the motor 132 drops to a very slow speed resulting in clockwise movement of the carrier 88 about its shaft 94 at the rate of about one-third RPM, which would be roughly equivalent to full travel from wide-open-throttle position to idle throttle position in about thirty seconds. An objective of this slow speed is to move the carrier 88 in limiting control of the throttle plate 35 at a slower rate than the response capability of the engine 20, thereby minimizing engine speed oscillations. Since the response capability of the engine will vary considerably according to loads and gear ratios, recovery time (from the loss of engine speed due to sudden application of a heavy load while running at the governed speed under light load) could be somewhat slow—however, this is not the usual condition and is overweighed by the stability of the system for normal operation.

The relation of engine response capability rate and throttle limiting means movement rate is a complex one, but consider that any engine running at idle speed and having full throttle suddenly applied will take a second or two to reach a speed of say 4000 RPM, and if a governor acts to close the throttle quickly to closed or idle throttle position upon attainment of the 4000 RPM speed, the engine speed will overshoot or overrun the 4000 RPM speed and then decelerate below the 4000 RPM speed and undershoot or underrun it, even though the governor acts to open to full throttle again immediately upon the speed dropping below 4000 RPM. This may cause oscillations of engine speed of 1000 RPM or more in an unloaded engine, rapidly enough to be disturbing to its operator, and resulting in a governor with very poor regulation. This is an example of a throttle limiting means moving at a very much faster rate than the engine response capability rate, and results in out-of-phase operation of engine and throttle as explained in my aforesaid prior patent.

On the other hand, it has been found that where the throttle can only be moved between idle and full positions over a period of about twenty seconds or more, then in-phase operation of engine and throttle occurs, as in the present invention, and very good governor regulation can be obtained. The engine has the capability of increasing its speed with very little lag behind the throttle position, even under heavy or full load, meaning that if the throttle is opened half-way at this slow rate or slower, that the engine will have come up in speed slowly with the slow opening and will have achieved its maximum sustained speed for this throttle opening and particular load momentarily after the throttle movement stops, and will overrun the aforesaid maximum sustained speed insignificantly, thereby staying essentially in phase with the throttle, even under no load conditions. In the commercial engine application range considered so far, an approximately twenty to twenty-five second throttle movement period seems about the optimum for satisfactory governor regulation for a smoothly operating governor and a period as short as seven or eight seconds causes objectionable oscillations. Of course, to obtain satisfactory restraint under no load engine run-up conditions and satisfactory recovery from sudden load applications, it is desirable to have fast throttle closing upon sudden acceleration of the engine, and fast throttle opening upon sudden deceleration. The apparatus of the present invention provides such capability for both fast and slow throttle movement through the use of a reference position for the throttle limiting means, such that throttle movement will be slow under normal conditions, but may be swift when needed for recovery of control of a rapidly fluctuating engine speed caused by some factor external to the governor. To date, the apparatus of the present invention is the only known solution to this problem for everyday commercial use, e.g., as for truck and bus engines. Upon arrival at its reference position, assuming that the engine speed still lies in the 4000-4300 RPM range, the carrier stops and remains in place, moving therefrom only upon detection of engine speed outside the 4000-4300 RPM range, and only at the above-mentioned slow speed, whether in open throttle or close throttle direction.

When the engine speed drops below 4000 RPM, the motor 132 is energized at the slow speed in open throttle direction and continues in that direction until the carrier contact 128 hits the limiting contact 120 and halts there, unless in the meantime the engine speed has risen again to 4000 RPM to cause the motor 132 to be reversed to close throttle direction, or has dropped below the 3400 RPM precall speed which will cause the carrier 88 to continue in open throttle direction, but at high speed after touching the contact 120. If the carrier contact 128 is halted upon touching the limiting contact 120, it remains there pending detection of engine speed rising to 4000 RPM to cause close throttle drive at the slow speed, or engine speed falling below the 3400 RPM precall speed to cause open throttle drive just as in the second embodiment; however, the motor 132 will return to its normal fast speed because the carrier contact 128 is contacting the limiting contact 120.

As a practical matter, on a long steep grade in a truck engine application, where a considerably open throttle position is required to maintain the engine at the 4000 RPM governed speed, after the throttle limiting means has been moved to the reference position, then the governor will allow the throttle to slowly open further to a point where its average position furnishes just the fuel needed to maintain 4000 RPM with only minor oscillations thereabout as the throttle is opened and closed slightly by governor detection of engine speed falling below 4000 RPM and then rising back to that speed.

The circuitry for obtaining the slow-motor speed in both directions, and only when the carrier contact 128 is out of contact with the limiting contact 120, comprises essentially a suitable resistor R31 placed in the 12 volt common supply connection to the motor 132 as shown in FIG. 7 in partial schematic detail. The resistor R31 reduces the voltage across the motor 132 sufficiently to cause it to run at the desirable low speed in close throttle direction where the force of the load speed governor spring 142 and throttle apparatus springs must be overcome, and a second resistor R30 in the open throttle connection between the transistor Q3 and the motor 132 reduces the voltage across the motor even further to compensate for the overrunning force applied by the governor spring 142 and throttle apparatus springs when the motor runs in throttle opening direction. A PNP transistor Q7 is connected in parallel with the resistor R31 and is controlled indirectly through additional circuitry (not shown) associated with the limiting contact 120 by the condition thereof. When contact 120 is grounded by contact with the carrier contact 128, the transistor Q7 is caused to be conductive, the resistor R31 is shunted out of the circuit and is of no effect, and the motor 132 runs at normal fast speed. When the carrier contact 128 leaves the limiting contact 120, leaving it ungrounded, then the transistor Q7 goes non-conducting and all current to the motor 132 must pass through the resistor 31, so that the motor runs at the desirable slow speed.

This third, slow speed, embodiment lessens the oscillations of engine speed, and would be preferable to the first, alternating circuit, embodiment except that the low motor voltages required to obtain a suitably slow operation of the motor 132 may not provide sufficient starting torque for reliable motor operation under extreme cold weather conditions. However, governors 30 according to this third embodiment have worked satisfactorily in moderate temperature conditions and commercially demonstrate the advantages of slow speed operation of the motor 132.

A fourth embodiment of my engine speed governor invention provides an improved means for obtaining the aforesaid very slow speed of the motor 132 as in the third embodiment disclosed herein, and also provides that such very slow speed operation occurs only when the engine 20 is connected to a power take-off (PTO) and the engine is automatically selectively governed in a PTO mode to a predetermined set speed, such as 2000 RPM, e.g., which is safe for operation of the PTO and which may be different from the predetermined set speed for the engine governing mode of operation, which may be 4000 RPM as explained hereinbefore. When the PTO is disconnected from the engine, the engine is automatically selectively governed in the engine governing mode by additional means provided therefor for operation generally similar to the engine governing mode of my aforesaid U.S. Patent, but differing particularly in that the carrier 88 moves initially upon actuation of the engine governing mode toward a reference position for the PTO governing mode and normally moves between that reference position and its full throttle position to govern the engine with considerable oscillation about the engine governing mode set speed, generally as with the apparatus of my aforesaid U.S. patent. In the event that the engine reaches a predetermined overspeed condition above the engine governing mode set speed and remains at such overspeed for a predetermined time, the carrier 88 (which serves as a throttle overriding means) will move in close throttle direction beyond the reference position toward the closed or idle throttle position.

The circuitry for providing the three modes of operation of this fourth embodiment, namely, road or load speed governor or governing, engine speed governing and PTO speed governing, is adapted for either spark ignited engines or diesel engines, and is shown in FIG. 8. The mechanical apparatus, arrangement, and operation may be the same as shown in FIGS. 1–4 and explained in connection with the other embodiments disclosed herein.

In general, the circuit comprises a speed signal generator 148 which develops an analog speed voltage corresponding to the value of engine speed. The output of the speed signal generator is coupled with an engine speed comparator 150 which develops a logic signal for use in controlling the throttle overriding means positioning motor 132. The logic signal from the comparator 150 is applied to a logic circuit 152 which controls the energization of the motor 132. The output of the logic circuit 152 is applied to the motor energizing circuit 154. The close throttle switching circuit 156 supplies an input signal to the logic circuit 152 according to the position of the carrier 88 and its contact 128. Similarly, an open throttle switching circuit 158 supplies an input signal to the logic circuit 152 according to the position of the contact 128. A power supply circuit 160 receives the vehicle battery voltage and supplies a regulated output voltage for the integrated circuits. The system thus far described is operative from the engine speed governing mode. The system also includes additional stages which are operative in the PTO governing mode. These additional stages include a PTO mode selector which comprises a PTO selector switch 162, a PTO engaging element 163 for connecting the PTO to the engine 20 and simultaneously actuating the switch 162, and a flip-flop 164. The flip-flop 164 supplies an input signal to the logic circuit 152 to initiate the PTO mode of operation. An oscillator circuit 166 is turned on by the selector switch 162 and provides an output to the logic circuit 152 to modulate the energization of the motor 132 in the PTO mode so that the motor 132 is operated at a reduced speed. When the PTO switch 162 is opened to initiate the PTO mode the flip-flop 164 is set so that the signal supplied to the logic circuit 152 causes the motor 132 to be driven in the close throttle direction. The output of the flip-flop 164 is also applied to the oscillator circuit 166 to disable the oscillator 166 and allow fast movement of the motor 132 to position the carrier contact 128 at its close throttle reference position as shown in FIG. 4 in solid lines. When the close throttle reference position is reached the close throttle switching circuit 156 drives a reset signal to the flip-flop 164 which changes state. When in the reset state, the flip-flop 164 does not disable the oscillator 166 and does not cause the motor 132 to be energized.

The overspeed circuit 168 is used in the engine speed governing mode and the PTO mode. The overspeed circuit 168 receives the speed signal from the engine speed signal generator 148 and produces an output signal to the logic circuit 152. When the speed is excessive (and remains excessive for a predetermined time of a few seconds) the overspeed signal is effective to override the close throttle switching circuit 156 and allows the motor 132 to drive the carrier 88 beyond the close throttle reference position.

The throttle switching circuit stages will be described later in greater detail.

The speed signal generator 148 develops an analog voltage which is proportional to engine speed. For this purpose, the generator 148 is adapted to receive engine ignition coil impulses on coil input 170 from the primary winding of the ignition coil of a spark ignited engine. It is also adapted to receive transducer impulses on transducer input 172 from a transducer on a diesel engine. The speed signal generator 148 is comprised of a frequency-to-voltage converter circuit. The converter circuit includes an input transistor 174 which is coupled to a monostable multivibrator or one shot 176. The one shot 176 comprises an integrated circuit and adds an external dividing circuit including the variable resistors 178 and 180 and the fixed resistor 182 in series with a timing capacitor 184 from ground to the 10 volt supply voltage. Variable resistors 178 and 180 may be adjusted to set the voltage across the capacitor 184 and thereby the governed speed at a desired value for both the engine governor mode and the PTO governor mode. A switching transistor 186 has its output connected in parallel with the variable resistor 178 and its input connected to the PTO selector switch 162. When the selector switch 162 is in the closed position to select the governor mode, the transistor 186 is turned on and the resistor 178 is bypassed to set the speed for the engine governor mode. When the selector switch 162 is open, the transistor 186 is turned off and resistor 48 remains in the timing circuit and sets a lower voltage across the capacitor 184 and thereby a lower speed for the PTO mode.

Assume that the control circuit is applied to an ignition engine and the ignition pulses are applied to the coil input 170. (The operation of the circuit will be same for a diesel engine with transducer pulses applied to the transducer input 172). The input pulses on the input 170 are applied through the input circuit to the base of the transistor 174 and each pulse turns on the transistor 174. The output of the transistor 174 is applied to the input terminal 188 of the one shot circuit 176, and each pulse triggers the one shot circuit 176. Each time the circuit 176 is triggered, the output terminal 190 of the one shot circuit 176 will be high for a certain length of time depending upon the time constant of the timing circuit. The output 190 is connected across the resistor 192 and the capacitor 194 which is charged to a voltage value corresponding to the engine speed. The speed voltage from the terminal 196 of the capacitor 194 is applied through the signal input of the comparator 150 which will be described below.

The speed comparator 150 is adapted to develop a speed logic signal in response to the analog speed signal. For this purpose, the speed signal voltage from the terminal 196 is applied to the noninverting input (which constitutes the signal input) of the comparator 150. A reference voltage which represents the desired governed speed is applied to the inverting input (the reference input) of the comparator 150. The reference voltage is derived from the power supply 160. In particular, the battery voltage, plus 12 v, is applied across the series resistor 198 and a zener diode 200 to obtain a regulated 10 V voltage for use with the integrated circuits. The regulated voltage is applied across a voltage divider string of resistors 202, 204 and 206. A reference voltage for the comparator 150 is taken from the junction of resistors 204 and 206 and applied to the reference input of the comparator 150. When the speed voltage on the signal input of the comparator 150 is less than the reference voltage, the output of the comparator 150 is at logic low and when the speed signal voltage is higher than the reference voltage the output of the comparator 150 is at logic high. This speed logic signal at the output of the comparator 150 is applied to the input of the logic circuit 152. It is desirable to have the speed comparator 150 switch between high and low outputs in response to somewhat different speed voltages so that there is a range or band of speed variations around the desired governed value which will not cause switching of the comparator 150. For this purpose, the comparator 150 is provided with a hysteresis band in a manner which will be described in connection with the logic circuit 152.

The logic circuit 152 comprises a NOR GATE 208 which receives the speed logic signal on a first input and receives a logic signal from the flip-flop 164 on a second input. For purposes of the present description, it will be assumed that the output of the flip-flop 164 is at logic low (which is the case during operation in the engine governor mode). The logic circuit also comprises an inverter 210 and a pair of NOR GATES 212 and 214. The output of the NOR GATE 208 is applied to a first input of the NOR GATE 214 and it is also applied through the inverter 210 to a first input of the NOR GATE 212. The NOR GATE 214 is adapted to control the energization of the motor 132 in the close throttle direction through the motor energizing circuit 154. The NOR GATE 214 receives a signal from the close throttle switching circuit 156 on a second input. It also receives an input from the oscillator 166 on a third input. The output of the NOR GATE 214 is applied to a first input of the motor energizing circuit 154 which will be described below. The NOR GATE 212 is adapted to control the energization of the motor 132 in the open throttle direction. The NOR GATE 212 receives a signal from the open throttle switching circuit 158 on a second input. The NOR GATE 212 also receives the output of the oscillator 166 on a third input. The output of the NOR GATE 212 is connected to a second input of the motor energizing circuit 154 which will be described below.

In order to provide hysteresis switching for the comparator 150, the output of the NOR GATE 208 is connected back to the set voltage input of the one-shot 176 from the capacitor 184. This feedback loop includes a diode 216 and a resistor 218. When the output of the NOR GATE 208 goes to logic low, current is bled from the capacitor 184, thereby changing the set voltage and the output of the one shot 176 and the speed voltage from the terminal 196.

The motor energizing circuit 154 comprises a power transistor Q3 which has its input at the base electrode connected with the output of the NOR GATE 214. The output of the transistor Q3 is connected with the close throttle winding terminal CTW of the motor 132 for energizing the motor in the close throttle direction. The energizing circuit 154 also includes a power transistor Q2 which has its input at the base electrode connected with the output of the NOR GATE 212. The output of the transistor Q2 is connected with the open throttle winding terminal OTW of the motor 132 and to ground through the switch contacts 136 and 134 unless they are opened by action of the load speed governor 86 as previously described and further described hereinafter.

The close throttle switching circuit 156 comprises a normally open switch contact 116 connected with the input of an inverter 220. The switch contact 116 is grounded by the carrier contact 128 when the motor 132 drives the overriding means or carrier 88 to the close throttle reference position as shown in FIG. 4. When the contacts 116 and 128 are closed the input of the inverter 220 is connected to ground to produce a logic low at the input and a logic high at the output of the inverter 220. The output of the inverter 220 is applied to the second input of the NOR GATE 214. Accordingly, the switch contacts 116 and 128 are open before the motor 132 drives the carrier 88 to the close throttle reference position and the output of the inverter 220 is at logic low. This has no switching effect on the NOR GATE 214. However, when the switch contacts 116 and 128 are closed the output of the inverter 220 is at logic high and the output of the NOR GATE 214 goes to logic low. This turns off the transistor Q3 and deenergizes the close throttle winding terminal CTW of the motor 132.

The open throttle switching circuit 158 comprises a switch contact 120 which is normally open and which is closed and grounded by the carrier contact 128 when the motor 132 drives the carrier 88 and the contact 128 to an open throttle reference position thereat. The switch contact 120 is thereby connected between ground and one input of a comparator 224 which is connected to function as an inverting circuit. For this purpose the other input of the comparator 224 is connected with a reference voltage taken from the junction of resistors 204 and 206 in the power supply 160. The output of the comparator 224 is connected with the second input of the NOR GATE 212. Accordingly, when the contact 120 is open, the output of the comparator 224 is at logic low and it has no effect on the NOR GATE 212. When the contact 120 is closed the output of the comparator 224 is at logic high and the output of the NOR GATE 212 is at logic low. This turns off the transistor Q2 and deenergizes the open throttle winding terminal OTW of the motor 132.

The overspeed circuit 128 comprises a comparator 226 and a comparator 228 which are adapted to respond to an engine overspeed condition and cause the motor 132 to be energized in the close throttle direction to drive the carrier 88 beyond the close throttle reference position in the close throttle direction. The comparator 226 has a signal input (non-inverting) connected with the terminal 196 to receive the speed signal voltage. The reference input (inverting input) for the comparators 226 and 228 is connected to a reference voltage at the junction of resistors 202 and 204 in the power supply 160. Note that the overspeed reference voltage is at a higher level than the governed speed reference voltage. The output of the comparator 226 is connected with the signal input (inverting input) of the comparator 228. The output of comparator 226 is also connected to the regulated voltage source through a resistor 230 and to ground through a capacitor 232. The reference input (non-inverting input) of the comparator 228 is connected with the reference voltage at the junction of resistors 202 and 204. Accordingly, when the speed voltage at the signal input of comparator 226 exceeds the reference voltage, the output of the comparator 226 goes to logic high and the capacitor 232 starts to charge through resistor 230. When the voltage across the capacitor 232 exceeds the reference voltage on the reference input of comparator 228, the output of the comparator 228 goes to logic low. The charging time for the capacitor 232 to exceed the reference voltage is approximately five seconds. The output of the comparator 228 is connected to the second input of the NOR GATE 214. When the output of the comparator 228 is at logic low, it overrides the effects of the logic signal applied from the contact 116 through inverter 220 to the same second input. This allows the motor 132 to drive the carrier 88 to a closed throttle position beyond the close throttle reference position as shown in FIG. 4.

The oscillator circuit 166 is adapted to produce a squarewave output with adjustable duty cycle for modulating the energization of the motor 132 when the control circuit is operated in the PTO mode. For this purpose, the output of the oscillator 166, as will be described, is connected to respective inputs of the NOR GATES 212 and 214. The oscillator 166 is turned off by the PTO selector switch 162 when it is in the closed position and it is turned on with the switch 162 in the open position. The oscillator circuit 166 comprises an inverter 234 and a NOR GATE 236. The input of the inverter 234 is connected through the diode 238 to the PTO selector switch 162. The output of the inverter 234 is connected through a conductor 240 to a first input of the NOR GATE 236. The output of the NOR GATE 236 is connected through a capacitor 242 to the input of the inverter 234. A circuit extends from the output of the NOR GATE 208 in logic circuit 152 through a resistor 244, diode 246, and diode 248 to the output of the inverter 234. The junction between the diodes 246 and 248 is connected through a resistor 250 and a parallel connected diode 252 to the input of the inverter 234. The NOR GATE 236 has a second input which is connected with the output of the comparator 226 in the overspeed circuit 168. When the output of the comparator 226 is high, the NOR GATE 236 is inhibited to stop the oscillator 166. A third input of the NOR GATE 236 is connected with the output of the flip-flop circuit 164 so that the output of the NOR GATE 236 is inhibited and the oscillator 166 is stopped when the flip-flop 164 is set, as will be described further below. When the PTO selector switch 162 is in the open position to select the PTO mode of operation, the oscillator 166 is operative to produce a train of output pulses on the output of the NOR GATE 236. This output is applied through a conductor 254 to a third input of the NOR GATE 214 and a third input of the NOR GATE 212. This has the effect of modulating the drive current to the motor 132 i.e. it reduces the average value of the input current to the motor 132 and causes the motor to operate at reduced speed yet with high torque during the pulses for reliability of operation at very slow speeds as compared to the slow speed at low constant direct current voltage as in the third embodiment of the present invention.

The flip-flop circuit 164 is adapted to initiate the operation of the control circuit in the PTO mode in response to opening of the PTO selector switch 162. The flip-flop circuit 164 comprises a pair of cross-coupled NOR GATES 256 and 258. The PTO selector switch 162 is connected between ground and a first input of the NOR GATE 258 through a capacitor 260. The first input is connected to ground through a resistor 262. The second input of the NOR GATE 258 is coupled with the output of NOR GATE 256. The output of the NOR GATE 258 is coupled with a first input of the NOR GATE 256 and the second or reset input of the NOR GATE 256 is connected with the output of the inverter 220 in the close throttle switching circuit 156. The output of the NOR GATE 256 is connected across a capacitor 264 and to the second input of the NOR GATE 208 in the logic circuit 152. The output of the NOR GATE 256 is also connected to the third input of the NOR GATE 236 in the oscillator 166. When the PTO selector switch 162 is opened, the first input of the NOR GATE 258 goes to logic high and the output thereof goes to logic low. This causes the output of the NOR GATE 256 to go to logic high. The high output from the NOR GATE 256 is applied to the third input of the NOR GATE 236 and disables the oscillator 166. This allows the motor 132 to drive the carrier contact 128 at full speed to its close throttle reference position as shown in solid lines in FIG. 4. The high output of the NOR GATE 256 on the second input of the NOR GATE 208 causes the output of the NOR GATE 208 to go to logic low. This causes the output of the NOR GATE 214 to go to logic high and the transistor Q3 is turned on to energize the motor 132 in the close throttle direction. When the motor 132 drives the contact 128 to its close throttle reference position, the contact 116 is grounded and the output of the inverter 220 goes to logic high. The output of the inverter 220 is applied to the reset input of the NOR GATE 256 and the flip-flop 164 is reset with the output of the NOR GATE 256 at logic low. This causes the transistor Q3 to turn off and it also allows the oscillator 166 to operate.

When the PTO selector switch 162 is in the closed position, the system operates in the engine governor mode. In this mode, a speed signal voltage is developed by the signal voltage generator 148 across the capacitor 194. This speed signal voltage is applied to the signal input of the comparator 150. The governed speed is established by the reference voltage across resistor 206 which is applied to the reference input of the comparator 150. When the engine speed is below the governed speed, the output of the comparator 150 is at logic low. This causes the output of the NOR GATE 208 to be at logic high and the output of NOR GATE 212 to be at logic high. This causes the transistor Q2 to turn on and the motor 132 is energized in the open throttle direction. When the motor 132 drives the contact 128 into contact with the contact 120 (the open throttle reference position), the contact 120 is grounded and the output of the comparator 224 (operating as an inverter) goes to logic high, but the output of the comparator 224 is grounded through the diode 266 and the switch 162 so that the NOR GATE 212 is not affected and the motor 132 continues to drive in the open throttle direction so long as the engine speed remains below the governed speed.

When the engine speed signal voltage is larger than the reference voltage, the output of the comparator 150 is at logic high. This causes the output of NOR GATE 208 to go to logic low and the output of the NOR GATE 214 to go to logic high. This turns on the transistor Q3 which energizes the motor 132 in the close throttle direction. When the motor 132 drives the contact 128 to the close throttle reference position the contact 116 is grounded and the output of the inverter 220 goes to logic high. This causes the output of the NOR GATE 214 to go to logic low and the transistor Q3 is turned off and the motor 132 is deenergized.

In this engine governor mode of operation, the engine speed is maintained around the governed speed, but with considerable oscillation, by the operation of the motor 132 driving the contact 128 back and forth within the limits of its close throttle reference position and its wide-open throttle position (which is beyond its open throttle reference position). In the event that the engine reaches an overspeed condition, the output of the overspeed circuit 168 goes to logic low and overrides the effect of the grounding of the contact 116 by the contact 128 at its close throttle reference position. This causes the output of the NOR GATE 214 to go to logic high which keeps the transistor Q3 turned on to drive the motor 132 to drive the contact 128 beyond its close throttle reference position.

When the PTO selector switch 162 is opened, the operation of the control circuit in the PTO mode is initiated. The opening of the switch 162 is effective to set the flip-flop 164 so that the output of NOR GATE 256 thereof goes to logic high. This causes the output of NOR GATE 208 to go to logic low and the output of NOR GATE 214 to go to logic high turning on the transistor Q3 and energizing the motor 132 in the close throttle direction. At the same time, closure of the switch 162 turns on the switching transistor 186 in the speed signal voltage generator 148 and bypasses the resistor 178. This changes the output of the signal generator 148 to a value corresponding to the PTO governing mode. Also, the output of the flip-flop circuit 164 in the set condition disables the oscillator circuit 166. When the motor 132 drives the contact 128 to its close throttle reference position, the contact 116 is grounded and the output of the inverter 220 resets the flip-flop 164. Thus, the transistor Q3 is turned off and the motor 132 is deenergized and the oscillator 166 is enabled.

In the PTO governing mode the circuit operates to maintain the engine speed at the PTO governing value in the manner as described for the engine governing mode except that the motor energization is modulated by the oscillator circuit 166 and the motor is operated only to move the contact 128 in a reference zone lying between its open throttle reference position and its close throttle reference position after its initial movement to its close throttle reference position upon opening of the PTO switch 162, the gap 122 between the contacts 116 and 120 being suitably large to allow sufficient opening of the throttle 35 to maintain governed speed under normal PTO loading. This mode of operation provides a relatively very slow movement of the carrier 88 and its contact 128 when the oscillator 166 is enabled, yet the pulses of the modulated current assure that the motor 132 exerts sufficient torque to reliably overcome the operational resistance of the governing elements which the motor 132 drives.

Control of the motor 132 by the load speed governor 86 (through movement of the carrier 88 and its open throttle and close throttle contacts 134 and 136 respectively, by action of the flyball mechanism 142 to move the grounding contacts 138) is the same as that disclosed in my aforementioned prior patent, whereby the load speed governor can overridingly run the motor 132 in close throttle direction in response to suitably high load speed at any time, and the engine speed governor 90 can do likewise at any time in response to a suitably high engine speed whether operating in engine governing or PTO governing mode, but the load speed governor can only run the motor 132 in open throttle direction in response to a suitably low load speed when the engine speed governor 90 is also calling concurrently for the motor to operate in that direction in response to a suitably low engine speed by making the transistor Q3 conductive, and vice-versa.

The fourth embodiment of the present invention offers two main advantages over the other three embodiments disclosed herein:

First, provision of a PTO governor in combination with an engine speed governor and a road speed governor means that a separate operator is not required to control the engine of a vehicle while a power take-off is being used, such manual control being difficult, demanding, and chancy in that complete attention is required to loading which may change frequently and unexpectedly. Also, the PTO-driven equipment may be damaged by inadvertent operation above relatively slow safe speeds, such as 1200 RPM or 2000 RPM, and PTO's are often inadvertently left engaged while the vehicle to which attached is put into over-the-road operation and the engine is operated at high speeds capable of damaging the PTO-driven equipment. This fourth embodiment eliminates all possibility of overspeeding damage to the engine or PTO-driven equipment and of unsafe vehicle speeds, for the present governor will automatically selectively govern the engine to limit it to a suitable predetermined set speed for engine, PTO, or vehicle, as needed, while not otherwise restricting their operation.

Second, provision of a modulating circuit for powering the governor drive motor 132 permits selective operation of the motor 132 at normal high speed, normal torque, and normal voltage, as well as at a relatively very low speed but still with normal torque and normal voltage, thereby assuring reliable operation at the low speed. Providing two such speeds mechanically, as by change gears, or conventionally electrically, as in the third embodiment disclosed herein, appear disadvantageous.

Operation of this fourth embodiment of my invention in the load or road speed governing mode is the same as that in the other embodiments. Operation in the engine governing mode is generally like that in my aforementioned patent except that the carrier 88 is normally limited to movement between its wide open throttle position and its closed throttle reference position for PTO governing mode as determined by the setting of the adjustable arcuate switch plate 92 and exemplified by the solid-line position of the contact 128 in FIG. 4. This additional limitation on the movement of the carrier 88 seems to be of little, if any, practical effect, since the closed throttle reference position for PTO mode allows only a small throttle opening beyond the full closed or idle throttle position.

Operation in the PTO governing mode of this fourth embodiment differs from operation in the engine governing mode of the third embodiment disclosed hereinbefore (which it most resembles) in various aspects as explained hereinafter. No precall for the carrier 88 to the close throttle reference position is based on engine speed in this fourth embodiment. Rather, the PTO engaging element 163 is commonly manually actuated while the throttle 35 is in idle position as in FIG. 3, thereby actuating the PTO selector switch 162 and causing the carrier 88 to move to its predetermined close throttle reference position at a relatively high rate of movement as explained hereinbefore. The carrier 88 stops at that position, and then the throttle operating mechanism is commonly manually moved to, and locked at a relatively wide open position while the overriding carrier 88 limits the throttle 35 from opening beyond a position which causes the engine 20 to operate under no load at approximately the desired predetermined set PTO governing speed, e.g. 2000 RPM.

Upon application of a load to the PTO-driven equipment, the speed of the engine 20 will immediately fall below the PTO set speed and the motor 132 will be energized as described hereinbefore by pulses of electrical current or power to cause movement of the carrier 88 and the throttle 35 in throttle opening direction at a predetermined unchanging average rate of movement selected to cause the engine speed to vary with the movement with minimal lag therebehind to prevent any significant PTO or engine speed oscillation about the predetermined set PTO speed. The current or power pulses may be of generally equal maximum amplitude as the current supplied for unmodulated energization of the motor 132, and exert relatively larger maximum forces than their relatively smaller average force to insure positive movement of the carrier 88 against the operational resistance imposed thereon and at the same time to cause the aforesaid average rate of movement thereof, which is relatively slow.

The present invention has been described in detail above for purposes of illustration only and is not intended to be limited by this description or otherwise to exclude any variation or equivalent arrangement that would be apparent from, or reasonably suggested by, the foregoing disclosure to the skill of the art, such as the substitution of vacuum or mechanical or other actuators, for the electrically driven lead screw disclosed herein, the substitution of centrifugal or magnetic or other engine speed responsive means for the electronic module disclosed herein, or the substitution of magnetic or electronic or other load speed responsive means for the fly ball mechanism disclosed herein. I.e., the scope of the present invention is to be determined by the scope of the appended claims.

I claim:

1. A speed-limiting governor for use with an engine having a throttle means mechanically movable between an open position and a closed position to regulate the flow of energy-supplying means to said engine, said governor comprising
   (a) means for sensing the speed of said engine;
   (b) means adapted to be connected to said throttle means for selectively overriding said mechanical operation thereof, said overriding means being movable in a first direction toward a closed throttle position and in a second direction toward an open throttle position, and being movable to a predetermined reference position intermediate said open and closed throttle positions; and (c) control means responsive to said speed sensing means for moving said overriding means in said first direction to said predetermined reference position when said engine speed reaches a first preset level.

2. A speed-limiting governor for use with an engine having throttle means movable between an open position and a closed position, said governor comprising means for sensing the speed of said engine, and throttle overriding means operatively associated with said speed sensing means for selectively engaging said throttle means to automatically move it toward said closed position thereof at a first relatively fast rate of movement when the speed of said engine exceeds a preset level and said throttle means is open beyond a predetermined reference zone intermediate said open and closed positions of said throttle means, and for controlling the movement of said throttle means in either a throttle opening or throttle closing direction to provide a second relatively slow rate of movement therefor when said throttle means is within said reference zone and is engaged by said overriding means.

3. A speed-limiting governor for use with an engine having means for selective driving connection to and disconnection from a power take-off and a vehicle, both individually and simultaneously, and having mechanically operated throttle means movable between a fully opened position and a fully closed position for causing variation of the speed of said engine, said governor comprising:

(a) means for sensing said speed of said engine;
(b) means for sensing the speed of said vehicle;
(c) means for generating a signal when said power take-off in connected to said engine;
(d) means adapted to be connected to said throttle means for selectively overriding said mechnical operation thereof, said overriding means being movable between an open throttle position and a closed throttle position for selectively limiting the speed of said engine and said vehicle to respective set speeds; and
(e) control means selectively
 (i) responsive to said power take-off connection signal and to said sensed engine speed for causing movement of said overriding means to limit the speed of said engine to a first predetermined set speed;
 (ii) responsive to said sensed vehicle speed for causing movement of said overriding means to limit the speed of said engine to a level that limits said vehicle speed to a predetermined set speed; and
 (iii) responsive to said sensed engine speed for causing movement of said overriding means to limit the speed of said engine to a second predetermined set speed.

4. A speed-limiting governor according to claim 3 and characterized further in that said control means selectively causes said movement of said overriding means to occur in at least one direction at a predetermined unchanging average rate of movement selected to cause said engine speed, in the normally loaded operation thereof, to vary with said movement with minimal lag therebehind and prevent any significant speed oscillation of said engine speed about at least one of said set speeds.

5. A speed-limiting governor according to claim 4 and characterized further in that said overriding means includes motor means for the driving thereof and said control means includes means for generating and transmitting power pulses to said motor means for operating said motor means, said power pulses exerting relatively larger maximum forces to insure positive movement of said overriding means against the operational resistance imposed thereon and exerting a relatively smaller average force for causing said average rate of movement of said overriding means.

6. A speed-limiting governor according to claim 3 and characterized further in that said overriding means is movable to a predetermined reference position intermediate said open and closed throttle positions and in that said control means causes said overriding means to move to said reference position in response to said signal being generated by the connection of said power take-off to said engine, said reference position being selected to cause said overriding means to limit opening movement of said throttle means beyond a position which causes said engine to operate at approximately said first set speed when said engine is under no load.

7. A speed-limiting governor for use with an engine having means for selective driving connection to and disconnection from a power take-off and having mechanically operated throttle means movable between a fully opened position and a fully closed position for causing variation of the speed of said engine, said governor comprising:

(a) means for sensing said speed of said engine;
(b) means for generating a signal when said power take-off is connected to said engine;
(c) means adapted to be connected to said throttle means for selectively overriding said mechanical operation thereof, said overriding means being movable between an open throttle position and a closed throttle position for limiting the speed of said engine and being movable to a predetermined reference position intermediate said open and closed throttle positions;
(d) control means responsive to said signal generated by connecting said power take-off to said engine for causing said overriding means to move to said reference position at a relatively fast rate of movement and thereafter to move at a relatively slow rate of movement during its movement within a predetermined reference zone adjacent said reference position.

8. In a speed limiting governor for use with an engine having a manually controlled throttle for regulating the flow of fuel to the engine, said governor being adapted to govern engine speed at a first preset value and to prevent the engine from operating in an unwanted overspeed condition, said governor being of the type comprising an overriding throttle closing means movable between a wide open throttle position and a close throttle position for limiting manually controlled movement of the throttle in the open throttle direction and allowing unlimited manually controlled movement of the throttle in the close throttle direction, said overriding throttle closing means being movable to the wide open throttle position by manual actuation of the throttle to the wide open throttle position before the engine is started and when the engine speed is less than the preset value, said governor comprising:

means for sensing the speed of said engine, a reversible electric motor coupled with the overriding throttle closing means and being responsive to motor control signals for energizing the motor in the close throttle direction or in the open throttle direction, control means responsive to the speed sensing means for producing motor control signals for energizing the motor for moving the overriding throttle closing means toward the wide open throttle position when the engine speed is below the first preset value and for moving it to a reference position when the engine speed exceeds the first preset value, said reference position being intermediate said wide open throttle position and said close throttle positions, whereby the overriding throttle closing means does not limit manual control of the throttle when the engine speed is below the first preset value but when the speed exceeds the first preset value it is moved to the reference position to enable fast throttle correction to prevent unwanted overspeed of the engine.

9. The invention as defined in claim 8 wherein said reference position of the overriding throttle closing means is that which allows sufficient movement of the throttle in the open throttle direction to maintain a substantially unloaded engine at a speed above said first preset value.

10. The invention as defined in claim 8 wherein said control means includes:

logic means for producing motor control signals for energizing said motor in the open throttle direction when said overriding throttle closing means reaches said reference position whereby the motor is driven alternately in the close throttle and open throttle directions to cause the engine speed to be maintained in the vicinity of said first preset level.

11. The invention as defined in claim 8 wherein said control means includes:

first and second switching means for energizing said motor respectively in the forward and reverse directions, first logic means operatively coupled with said switching means for producing motor control signals for energizing said motor in the close throttle direction when the engine speed exceeds the first preset level, second logic means for producing motor control signals for energizing said motor in the open throttle direction when the overriding throttle closing means reaches said reference position, whereby said motor is driven alternately in the close throttle and open throttle directions to cause the engine speed to be maintained in the vicinity of said first said preset level.

12. The invention as defined in claim 11 wherein said second logic means comprises:

first and second electrical switch contacts, the first contact being reversibly movable by said motor and adapted to engage the second contact when the overspeed throttle closing means reaches said reference position.

13. The invention as defined in claim 11 wherein said control means includes:

third logic means responsive to a predetermined value of acceleration of said engine for producing motor control signals for energizing said motor in the close throttle direction before the speed reaches the first preset value, and means including said second logic means for producing motor control signals for energizing the motor in the open throttle direction when the overriding throttle closing means reaches said reference position.

14. The invention as defined in claim 11 wherein said motor control means includes:

fourth logic means operatively coupled with the speed sensing means and with said switching means and being responsive to an overspeed value of engine speed for overriding said second logic means whereby the overriding throttle closing means is moved beyond the reference position toward the close throttle position for reducing the speed below the overspeed value.

15. The invention as defined in claim 8 wherein said control means includes:

logic means for producing motor control signals for deenergizing said motor with said overriding throttle limiting means at said reference position and maintaining it deenergized as long as the engine speed remains within a predetermined speed range between said first preset value and a second preset value, the second preset value being higher than the first.

16. The invention as defined in claim 8 wherein said control means includes:

first logic means for producing motor control signals for energizing said motor for operation at a lower speed for moving said overriding throttle limiting means in the open throttle direction than in the close throttle direction.

17. The invention as defined in claim 16 wherein said control means includes:

second logic means for producing motor control signals for energizing the motor for operation at said slower speed for moving the overriding throttle limiting means in the open throttle direction until the speed exceeds said first preset value.

18. The invention as defined in claim 17 wherein said control means includes:

first, second and third electrical switch contacts, the first contact being reversibly movable by said motor and adapted to engage the second contact when the overriding throttle closing means reaches the reference position and adapted to engage the third contact when the overriding throttle closing means reaches a limiting position, said limiting position being between the wide open throttle position and the reference position, third logic means for producing motor control signals for deenergizing the motor when the first contact engages the third contact whereby the overriding throttle closing means is halted at the limiting position, and fourth logic means for producing motor control signals for energizing the motor for moving the overriding throttle limiting means in the open throttle direction when the engine speed falls below a second preset value lower than the first preset value, whereby the overriding throttle closing means remains in said limiting position until the engine speed increases above the first preset value or decreases below the second preset value.

19. The invention as defined in claim 8 wherein said control means includes:
  logic means for producing motor control signals for energizing the motor for movement of the overriding throttle closing means in reversing directions within a predetermined reference zone which is adjacent said reference position and which is intermediate said open and close throttle positions,
  said means for modifying said motor control signals for producing a relatively slow rate of movement when the overriding throttle closing means is within said predetermined reference zone and a relatively fast rate of movement when the overriding throttle closing means is outside said predetermined reference zone.

20. The invention as defined in claim 19 wherein said logic means includes:
  first, second and third electrical switch contacts, the first contact being reversibly movable by said motor and adapted to engage the second contact when the first contact reaches the reference position and adapted to engage the third contact when the first contact reaches a limiting position, said limiting position being between the wide open throttle position and the reference position, the positions of said second and third contact defining said predetermined reference zone.

21. The invention as defined in claim 8 wherein said governor is adapted for use with a throttle having a bias spring urging the throttle toward the close throttle position, and wherein said motor control means includes:
  logic means coupled with the first said logic means for producing motor control signals for energizing the motor for operation in the open throttle direction with a higher voltage than that for operation in the close throttle direction threrby compensating for the force of the bias spring so that the motor speed is substantially the same in both close throttle and open throttle directions.

22. The method of operating a governor for an internal combustion engine which has a throttle movable between an open throttle position and a close throttle position for regulating the flow of fuel to the engine, said governor being of the type comprising an overriding throttle closing means which, when actuated, limits the movement of the throttle in the open throttle direction but does not limit it in the close throttle direction, said method comprising the steps of:
  deactuating the overriding throttle closing means whereby it is released for movement to the wide open throttle position by manual actuation of the throttle when the engine is not running and when it is running at a speed lower than a first preset value,
  moving the overriding throttle closing means to a reference position when the engine speed increases to a value in excess of the first preset value, said reference position being intermediate the wide open throttle position and the close throttle position,
  moving the overriding throttle closing means toward the open throttle position when it reaches the reference position,
  and moving the overriding throttle closing means toward the open throttle position when the engine speed falls below said first preset value,
  whereby the governor prevents operation of the engine at unwanted overspeed and maintains the speed of the engine within the vicinity of said first preset value.

23. The invention as defined in claim 22 including the steps of:
  moving the overriding throttle closing means in the open throttle direction when it reaches the reference position whereby the overriding throttle closing means is moved alternately in the close throttle and open throttle directions to cause the engine speed to be maintained in the vicinity of the first preset value.

24. The invention as defined in claim 22 including the steps of:
  moving the overriding throttle closing means toward the close throttle position before the speed reaches said first preset value in response to a predetermined value of acceleration of the engine,
  and moving the overriding throttle closing means in the open throttle direction when it reaches said reference position.

25. The invention as defined in claim 22 including the step of:
  moving the overriding throttle closing means beyond the reference position toward the close throttle position in response to a second preset value of engine speed, the second preset value being higher than the first preset value.

26. The invention as defined in claim 22 including the step of:
  stopping the overriding throttle limiting means at said reference position and holding it there as long as the engine speed remains within a predetermined speed range between said first preset value and a second preset value, the second preset value being higher than the first.

27. The invention as defined in claim 22 including the step of:
  moving said overriding throttle closing means at a slower speed in the open throttle direction than in the close throttle direction.

28. The invention as defined in claim 27 including the step of:
  halting the movement of the overriding throttle closing means in the open throttle direction when it reaches a limiting position, said limiting position being between the wide open throttle position and the reference position,
  and moving the overriding throttle closing means in the open throttle direction when the engine speed falls below a second preset value which is lower than the first preset value,
  whereby the overriding throttle closing means will remain in the said limiting position until the engine speed increases above the first preset value or decreases below the second preset value.

29. The invention as defined in claim 22 including the steps of:
  stopping the movement of the overriding throttle closing means in the open throttle direction when it reaches a predetermined limiting position if the speed has not decreased below the first preset value and reversing its direction so that it is moved in alternate directions within a predetermined reference zone adjacent said reference position, said limiting position being between the reference position and the wide open throttle position,
  the movement within the reference zone being at a relatively slow rate and the movement outside of the reference zone being at a relatively fast rate.

* * * * *